United States Patent [19]

Yoshikawa

[11] 4,322,148

[45] Mar. 30, 1982

[54] INFORMATION INDICATING DEVICE FOR SINGLE LENS REFLEX CAMERA WITH BUILT-IN FLASH UNIT

[75] Inventor: Ryoichi Yoshikawa, Yokohama, Japan

[73] Assignee: Canon Kabushiki Kaisha, Tokyo, Japan

[21] Appl. No.: 180,937

[22] Filed: Aug. 25, 1980

[30] Foreign Application Priority Data

Aug. 29, 1979 [JP] Japan .................................. 54-110120

[51] Int. Cl.³ ...................... G03B 15/02; G03B 15/03; G03B 19/12; G03B 17/20
[52] U.S. Cl. ...................................... 354/128; 354/53; 354/145; 354/152
[58] Field of Search ............... 354/127, 128, 219, 289, 354/225, 53, 152, 155, 145

[56] References Cited

U.S. PATENT DOCUMENTS

| | | | |
|---|---|---|---|
| 3,218,946 | 11/1965 | Lange | 354/219 X |
| 3,416,422 | 12/1968 | Dietrich et al. | 354/128 |
| 3,635,136 | 1/1972 | Hori et al. | 354/128 |
| 3,788,202 | 1/1974 | Wiessner | 354/152 |
| 4,153,355 | 5/1979 | Ikawa et al. | 354/145 X |
| 4,204,756 | 5/1980 | Kobori et al. | 354/53 |

*Primary Examiner*—Donald A. Griffin
*Attorney, Agent, or Firm*—Toren, McGeady & Stanger

[57] ABSTRACT

A device for indicating information relating to the condition of a flash unit in the view finder of a camera is provided with a first light transmitting member whose input terminal is arranged in the flash unit and a second light transmitting member arranged in the camera body with an output terminal positioned at the view finder of the camera to provide in the view finder an indication that the flash mode is selected.

9 Claims, 5 Drawing Figures

INFORMATION INDICATING DEVICE FOR SINGLE LENS REFLEX CAMERA WITH BUILT-IN FLASH UNIT

BACKGROUND OF THE INVENTION

The present invention relates to an information indicating device for a camera, particularly a single lens reflex camera with a built-in flash unit.

Recently, it has become commonplace to build a flash unit into a lens shutter camera for the sake of portability.

Although it is also desired to build a flash unit into a single lens reflex camera, this has not been easy to accomplish in the single lens reflex camera because in the case of the single lens reflex camera a flash unit with a large guide number is needed because of the large variety of photography conditions involved. Furthermore, it is necessary to indicate information relative to flash photography such as the flash light emission confirmation as well as the completion of the change over into the flash mode to enable operability.

Recently, it has become more practical to build the flash unit into the single lens reflex camera because of the availability of a compact flash unit with a large guide number. This is due to the realization of condensers with special shapes, compact xenon tubes and further due to the development of compound components such as thyristers. Nevertheless, it is still difficult to provide a single lens reflex camera with a built-in flash unit because of the difficulty involved in indicating in the view finder information regarding the condition of the flash unit such as the completion of the change over into the flash mode.

This difficulty arises because the source of the information is distant from the view finder optics of the camera or in the case of the single lens reflex camera the mirror is raised so as to interrupt the view finder light path during film exposure.

An object of the present invention is to provide an information indicating device for a single lens reflex camera with a built-in flash unit free from the above-mentioned shortcomings and capable of indicating in the view finder information relative to the flash unit such as the completion of the change over into the flash mode.

SUMMARY OF THE INVENTION

Briefly, the present invention may be described as an indicator mechanism for a single lens reflex camera including a built-in flash unit, a view finder and means for selectively enabling operation of the camera in a flash mode comprising first light transmitting means for effecting transmission of light from within said flash unit, second light transmitting means for effecting transmission of light from said first light transmitting means to said view finder and indication means for placing said first and said second light transmitting means in light transmitting relationship with each other only when said camera is set for operation in said flash mode to provide in the view finder an indication of the operating condition of said flash unit.

In one embodiment of the invention, the first light transmitting means is movable with the flash unit in order to place the first and the second light transmitting means into and out of light transmitting relationship.

In another embodiment, a movable light shield is provided between the first and the second light transmitting means.

DESCRIPTION OF THE PREFERRED EMBODIMENTS

Figure 1:
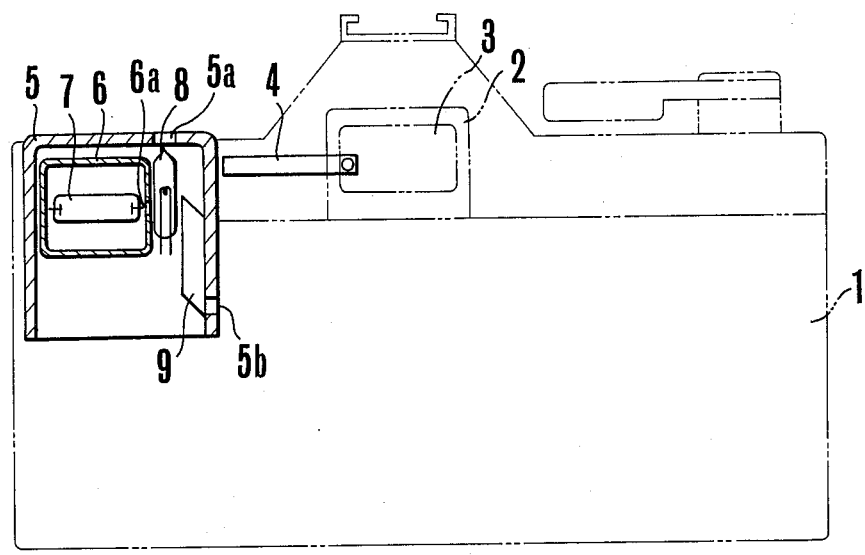
FIGS. 1 and 2 are schematic diagrams showing a first embodiment of the present invention.

FIG. 1 shows the outline of a single lens reflex camera with a built-in flash unit in accordance with the present invention, with the camera shown when it is not in the flash mode. In the drawing, 1 is the camera body, 2 is the eye piece lens frame, 3 is the eye piece lens, 4 is a second light transmitting member secured in the camera body, 5 is the housing of a conventional flash unit built-in the camera, 5a is a transparent window for visually recognizing the flash ready indicating neon tube 8 from outside, 6 is a reflector, 6a is a hole provided in the side wall of the reflector, 7 is a Xenon tube and 9 is a first light transmitting member secured in the housing 5 so as to lead the light from the Xenon tube 7 and the neon tube 8 into the camera body through a hole 5b in the housing 5.

Figure 2:
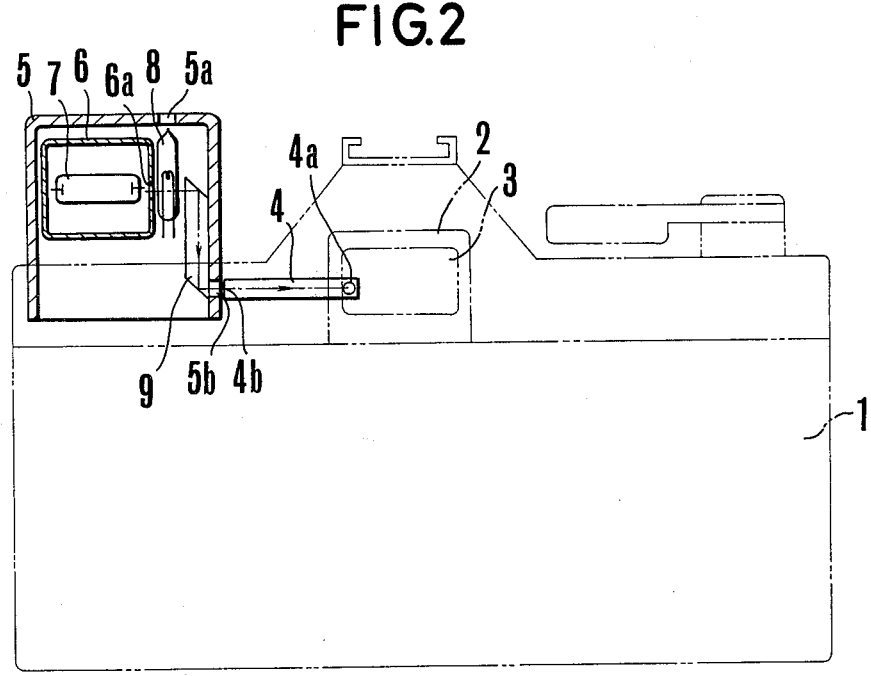

FIG. 2 shows the single lens reflex camera of FIG. 1 when it is set in the flash mode. In the drawing, 4a is an output terminal of the above light transmitting member 4 provided at the position at which it is visually recognized through the eye piece lens. 4b is the input terminal of the second light transmitting member, provided so as to face to the output terminal of the first light transmitting member 9 in the flash unit housing when the camera is set in the flash mode.

Figure 3:
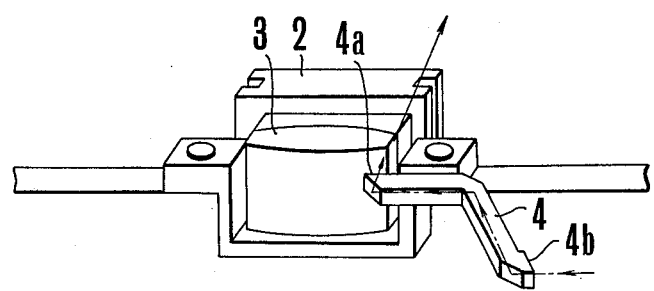
FIG. 3 is a perspective view showing an enlargement of part of the camera shown in FIG. 1.

FIG. 3 shows the second light transmitting member 4 secured in the camera body 1 in FIGS. 1 and 2, seen from the inside of the camera in perspective view.

Below, the operation of the single lens reflex camera of the above-mentioned construction will be explained in accordance with FIGS. 1 and 3. In case the camera is not in the flash mode, the output terminal of the first light transmitting member 9 provided in the flash unit housing 5 built-in the camera body does not face to the input terminal 4b of the second light transmitting member 4 provided in the camera body 1 (FIG. 1), so that the information relative to flash photography is not indicated in the view finder, from which it is confirmed in the view finder that the camera is not in the flash mode.

In case on the other hand, the camera is changed over into the flash mode the housing 5 of the flash unit is raised, as is shown in FIG. 2, by means of a spring or the like not shown in the drawing in such a manner that the light is led to the first light transmitting member 9 through the hole 6a provided in the side wall of the reflector 6 and the neon tube 8 and further into the view finder through the second light transmitting member 4. In this way, the fact that the flash unit and the camera have been changed over into the flash mode is indicated in the view finder so as to be visually acknowledged. When the charge in the main condenser (not shown) of the flash unit reaches a certain determined amount so as to light the neon tube 8, the light emitted from the neon tube 8 passes through the window 5a provided in the housing 5 so as to be visually recognized by the photographer and at the same time passes into the view finder through the first and the second light transmitting members 9 and 4 in such a manner that it can be visually recognized in the view finder that the main condenser has been charged.

When the camera is released, the mirror is lifted so as to interrupt the light path of the view finder. When the shutter is opened the Xenon tube 7 emits flash light in a conventional way, whereby a part of the flash light passes into the view finder, in the same way as in the above case, through the hole 6a provided in the side wall of the reflector, the neon tube 8, the first and the second light transmitting members 9 and 4 in such a manner that the fact that the flash light has been emitted in indicated in the view finder so as to be visually acknowledged.

Figure 4:
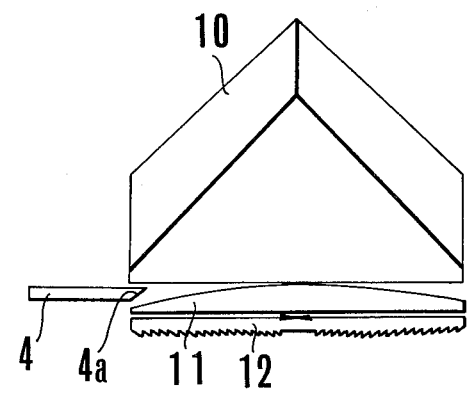
FIG. 4 is a schematic diagram showing an important part of the second embodiment of the present invention.

FIG. 4 shows an enlargement of an important part of a second embodiment of the present invention wherein the output terminal 4a of the second light transmitting member 4 is arranged between a pentagonal prism 10 and a condenser lens 11. Other members are the same as those of the first embodiment and therefore omitted here. In accordance with the second embodiment, the informations relative to flash photography such as the charge completion information, the flash light emission information and so on are led in the vicinity of a focusing glass 12 so as to be equal to other photographing information in visibility.

Figure 5:
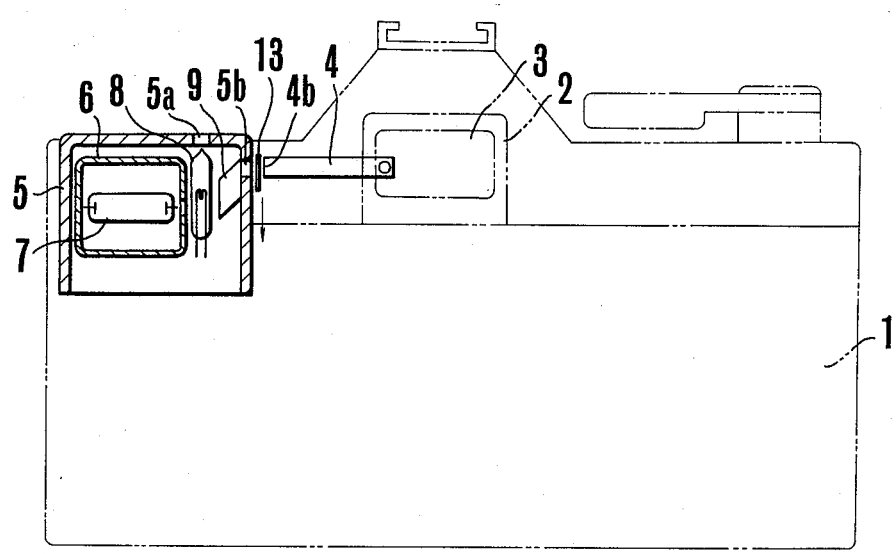
FIG. 5 is a schematic diagram showing a third embodiment of the present invention in general.

FIG. 5 shows the outline of a third embodiment of the single lens reflex camera with built-in flash unit of the present invention. In the drawing, similar members are identified with the similar reference characters as those in FIGS. 1 to 4.

Below, the difference between the former embodiments and the third embodiment will be explained. In the case of the first and the second embodiments the built-in flash unit is raised upwards as is shown in FIG. 2 when the flash mode is selected, while in case of the third embodiment the flash unit remains in the first position.

In the case of the third embodiment shown in FIG. 5, when the flash mode is selected a light interrupting member 13 provided between the output terminal of the first light transmitting member 9 and the input terminal 4b of the second light transmitting member 4 is moved along the direction of the arrow A by means of the photography mode change over means not shown in the drawing, whereby the light coming through the first light transmitting member 9 from the neon tube 8, the Xenon tube 7 and so on or the light from outside for indicating the flash mode is led to the second light transmitting member 4 through the hole 5b in the same way as in case of the first and the second embodiment such that information relative to the states of the flash unit are indicated in the view finder.

Further, when the day light mode is selected, the light shading member 13 is brought back between the hole 5b and the second light transmitting member 4, as is shown in FIG. 5, by means of the photography mode change over member, whereby light is prevented from travelling through the first and the second light transmitting member, such that information relative to the flash photography are not indicated in the view finder, from which it can be confirmed that the camera is not in the flash mode.

As has been explained so far, in accordance with the present invention the information relative to the flash photography as well as the change over completion into the flash mode can be indicated by means of a simple construction, which not only contributes to the realization of a single lens reflex camera with the built-in flash unit but also avoids misoperation of the flash unit.

Although in the above-mentioned embodiments the light coming from outside through the hole 5a is made use of in order to indicate the change over of the mode into the flash mode, it is also possible to confirm that the mode has been changed over into the flash mode, by confirming the information relative to the flash photography from the neon tube and the Xenon tube, so that the hole 6a is not always necessary. Further, in case of the above-mentioned embodiments all the information relative to flash photography is led to one position by means of a light transmitting member consisting of fiber or plastic, whereby the same efficiency can be obtained by arranging one light transmitting member for each item of information.

Further, by selecting the light permeability of particularly the light transmitting member for leading the light from the Xenon tube lower than that of other light transmitting members the brightness of the information relative to the flash photography entering into the view finder can be made almost equal to each other in order to facilitate the observation of the indication in the view finder.

While specific embodiments of the invention have been shown and described in detail to illustrate the application of the inventive principles, it will be understood that the invention may be embodied otherwise without departing from such principles.

What is claimed is:

1. An information indicated device for a single lens reflex camera with a built-in flash unit and a view finder comprising:
  (a) a first light transmitting member including an input terminal, with at least said input terminal of said member being arranged in said flash unit so as to transmit information light relating to operation of said flash unit;
  (b) a second light transmitting member arranged in the camera body and including an output terminal positioned at said view finder of the camera; and
  (c) first means for making both of said light transmitting members light permeable between each other only when the flash mode of operation of said camera is selected.

2. An information indicating device for a single lens reflex camera with a built-in flash unit and a view finder, comprising:
  (a) a first light transmitting member including an input terminal, with at least said input terminal of said member being arranged in said flash unit so as to transmit information light relating to operation of said flash unit;
  (b) means arranged in said flash unit to transmit light from outside to said first light transmitting member;
  (c) a second light transmitting member arranged in the camera body and including an output terminal positioned at said view finder of said camera; and
  (d) first means for making both of said light transmitting members light permeable between each other only when the flash mode of operation of said camera is selected.

3. An information indicating device for a single lens reflex camera with a built-in flash unit in accordance with claim 2, wherein said input terminal of said first light transmitting member is arranged at a position in said flash unit at which said input terminal transmits light from a Xenon tube of said flash unit.

4. An information indicating device for a single lens reflex camera with a built-in flash unit in accordance with claim 2, wherein said first means are provided between both of said light transmitting members and consist of a light shading member movable between a first position at which both said light transmitting members are made light permeable between each other in accordance with change over of the photographing mode of operation of said camera and a second position at which both said light transmitting members are made light shading between each other.

5. An indicator mechanism for a single lens reflex camera including a built-in flash unit, a view finder and means for selectively enabling operation of said camera in a flash mode comprising first light transmitting means for effecting transmission of light from within said flash unit, second light transmitting means for effecting transmission of light from said first light transmitting means to said view finder and indication means for placing said first and said second light transmitting means in light transmitting relationship with each other only when said camera is set for operation in said flash mode to provide in said view finder an indication of the operating condition of said flash unit.

6. A mechanism according to claim 5 wherein said flash unit is movable between a first position and a second position, said flash unit being in said first position when said camera is set for operation in said flash mode and wherein said indication means comprise means for effecting positioning of said first and second light transmitting means relative to each other into and out of light transmitting relationship.

7. A mechanism according to claim 6 wherein said first light transmitting means is affixed in said flash unit and movable therewith relative to said second light transmitting means.

8. A mechanism according to claim 6 or 7 wherein said indication means comprise orifice means in said built-in flash unit located to enable transmission of light between said first and said second light transmitting means.

9. A mechanism according to claim 5 wherein said indication means comprise a light shield movable to block and unblock a light path between said first and said second light transmitting means.

* * * * *